Patented June 28, 1949

2,474,636

UNITED STATES PATENT OFFICE 2,474,636

VITREOUS ENAMEL OPACIFICATION AND PROCESS

Henry Oesterle and Robert A. Oesterle,
Belleville, Ill.

No Drawing. Application July 12, 1946,
Serial No. 683,158

3 Claims. (Cl. 106—48)

This invention relates to opacifiers for porcelain enamels and more specifically to opacification of zirconium frits by the use of calcined alumina as a mill addition opacifier.

We have now discovered that by the use of from ½% to 3% based upon the weight of the frit of alpha alumina as a mill addition for opacification of vitreous enamels of the zirconium type we are able to improve the whiteness of such enamels. This effect was not to be expected inasmuch as alumina has no whitening effect as a mill addition in most porcelain enamels. The result is that improved opacity is attained by the use of a relatively very cheap material as compared to previous opaquing agents.

By zirconium type enamel we mean those made from frits now being sold in commercial quantities and known in the trade as zirconium frits, as well as similar compositions. These frits are characterized by the use in their formulae of relatively large quantities of zirconium oxy-compounds usually in the form of the mineral zircon as well as alkali, silica, alumina, boric oxide, fluorine and optionally minor constituents such as alkaline earths, zinc oxide, lead oxide, phosphorus, magnesia, etc. Some sample compositions (theoretical melted) are shown in Table I.

Table I

| | Sample No. | | | | |
|---|---|---|---|---|---|
| | 1 | 2 | 3 | 4 | 5 |
| $ZrO_2$ | 14.7 | 14.8 | 12.8 | 13.0 | 11 |
| $SiO_2$ | 25.3 | 27.0 | 31.6 | 30.0 | 48 |
| $B_2O_3$ | 9.0 | 13.7 | 12.6 | 13.0 | 7 |
| $Na_2O$ plus $K_2O$ | 12.9 | 13.0 | 14.9 | 14.5 | 17 |
| $Al_2O_3$ | 7.0 | 7.4 | 7.7 | 10.0 | |
| $ZnO$ | 8.4 | 19.9 | 2.7 | 3.0 | 1.5 |
| $BaO$ | 5.4 | | | | |
| $CaO$ | 1.8 | | 6.1 | 6.0 | 1.5 |
| $CaF_2$ | 7.2 | 6.2 | | | |
| $PbO$ | 8.2 | | | | |
| $Na_3AlF_6$ | | 4.0 | | | |
| $P_2O_5$ | | | 2.4 | 0.5 | |
| $F_2$ | | | 12.0 | 10.0 | 9 |

Zirconium frit formulae are devised with great attention to detail and vary over a wide range of proportions, essentially they contain about 20% to 50% of $SiO_2$, 5% to 20% $ZrO_2$, 5% to 15% $B_2O_3$, 5% to 20% $Al_2O_3$ and 5% to 20% $F_2$. Other ingredients are optional and impart various properties which are desirable but not absolutely necessary. Frit batches so constituted are smelted and quenched and mixed at the mill with various usual materials such as electrolyte, suspending agent, water and pigments or opacifiers. The use of alpha alumina is effective to increase whiteness when used as a mill addition opacifier with such frits.

Alumina is transformed to the alpha crystal form by calcination consequently suitably calcined alumina is the material which is used according to our invention. The degree of transformation by calcination of $Al_2O_3$ which had been heated to 500° C. and contained 2% to 3% moisture is shown in Table II. Calcination was for one hour at the temperature shown. Longer heating would give greater transformation at a given temperature except where the transformation is complete at the given temperature and time.

Table II

| Temperature, Centigrade | Crystal form as shown by X-ray Analysis |
|---|---|
| 600 | Largely amorphous. |
| 900 | Largely Beta Form. |
| 1,100 | Beta plus Alpha Forms. |
| 1,200 | Largely Alpha Form. |
| 1,800 | All Alpha Form. |

Calcination at 1000° C. for 5 to 10 hours or more will give a useful product but we prefer to heat above 1200° C. for one hour or more and best results are had by heating at 1800° C. for an hour or more. Heating may be in an atmosphere of air or other non-reducing atmosphere. Using 2% of alumina calcined at various temperatures in the same frit and keeping all conditions comparable except the time of calcination of the alumina resulted in enamels having the following reflectances:

(1) $Al_2O_3$ calcined at 600° C., reflectance 69.9,
(2) $Al_2O_3$ calcined at 900° C., reflectance 70.0,
(3) $Al_2O_3$ calcined at 1100° C., reflectance 70.2,
(4) $Al_2O_3$ calcined at 1200° C., reflectance 70.5,
(5) $Al_2O_3$ calcined at 1800° C., reflectance 70.6.

While these data do not show a smoothly rising curve, they do show a definite improvement in the region of 1000° C.–1200° C. and we have found that heating for 5 hours at 1000° C. will give definite improvement consistently as well as heating at 1200° C. to 1800° C. for 1 hour or more.

The use of alpha alumina as a mill addition opacifier was tried out in five different commercial frits, one from each of five commercial producers of zirconium type frits (exact compositions unknown to us but definitely similar to the compositions of Table I). In all cases a definite whitening effect was obtained. In frits of the antimony type no improvement was noted. While alpha alumina did not give greater whiteness than some commercial mill addition opacifiers now being sold for zirconium frits, it did give opaquing effects of the same order and, on account of its lower cost, appears to have a definite practical advantage over any of them.

The effect of using various amounts of alpha alumina in zirconium type enamels (using a frit approximating Sample 4 of Table I) is shown by Table III which is based upon a series of tests using varying amounts as mill addition and measuring the reflectance of the resulting enamels, the rate of application being 40 gm. per sq. ft. in all cases and other conditions being identical.

*Table III*

| Per Cent Alpha Alumina by Weight at the Mill | Reflectance in Per Cent MgO=100% |
|---|---|
| 0 | 72.9 |
| 0.5 | 73.1 |
| 1 | 73.5 |
| 2 | 73.9 |
| 4 | 74.2 |
| 8 | 74.6 |

The use of alpha alumina at the mill is advantageous not only in its opaquing effect as indicated but also in that it gives a more nearly uniform opacity, clouding very small transparencies which are visible to the eye but do not show up in the total reflectance as measured by the reflectometer. It is possible to obtain somewhat improved opacity by the use of alumina which has been only partially converted to the alpha form, however such material is not as good as that which has been completely or nearly completely converted to the alpha form.

This application is a continuation-in-part of our application, Serial No. 611,256, filed August 17, 1945, now abandoned.

Having thus described our invention, what we claim is:

1. In a process of making a vitreous enamel, the step of milling a zirconium type frit comprising 20% to 50% $SiO_2$, 5% to 20% $ZrO_2$, 5% to 15% $B_2O_3$, 5% to 20% $Al_2O_3$ and 5% to 20% $F_2$, percentages being by weight, together with from ½% to 8% of the weight of said frit of alpha alumina.

2. A vitreous enamel composition essentially consisting of a zirconium type frit, and a mill addition opacifier, said frit comprising from 20% to 50% $SiO_2$, 5% to 20% $ZrO_2$, 5% to 15% $B_2O_3$, 5% to 20% $Al_2O_3$, and 5% to 20% $F_2$, and said mill addition opacifier being alpha alumina in proportion of from ½% to 8% of the frit, by weight.

3. A vitreous enamel composition essentially consisting of a zirconium silicate containing frit and from ½% to 8% of the frit, by weight, of alpha alumina, said frit on a theoretical melted composition basis comprising $ZrO_2$ 11 to 14.8 parts by weight, $SiO_2$ 25.3 to 48 parts by weight, $B_2O_3$ 7 to 13.7 parts by weight, $Al_2O_3$ 7 to 10 parts by weight, $Na_2O$ plus $K_2O$ 13 to 17 parts by weight, and $F_2$ from 2 to 12 parts by weight.

HENRY OESTERLE.
ROBERT A. OESTERLE.

REFERENCES CITED

The following references are of record in the file of this patent:

UNITED STATES PATENTS

| Number | Name | Date |
|---|---|---|
| 1,104,266 | Mayer et al. | July 21, 1914 |
| 2,347,187 | Frost | Apr. 25, 1944 |

FOREIGN PATENTS

| Number | Country | Date |
|---|---|---|
| 70,217 | Austria | 1915 |
| 5,790 | Holland | 1921 |
| 705,665 | Germany | 1941 |